United States Patent [19]

Park

[11] Patent Number: 5,567,742

[45] Date of Patent: Oct. 22, 1996

[54] DIMENSIONALLY-STABLE POLYPROPYLENE FOAM EXPANDED WITH INORGANIC BLOWING AGENTS

[75] Inventor: Chung P. Park, Pickerington, Ohio

[73] Assignee: The Dow Chemical Company, Midland, Mich.

[21] Appl. No.: 267,096

[22] Filed: Jun. 28, 1994

Related U.S. Application Data

[63] Continuation of Ser. No. 141,902, Oct. 22, 1993, abandoned, which is a continuation-in-part of Ser. No. 831,123, Feb. 4, 1992, abandoned.

[51] Int. Cl.$^6$ .................................. C08J 9/12; C08J 9/14
[52] U.S. Cl. ........................... 521/143; 521/82; 521/94; 521/97; 521/98
[58] Field of Search ....................... 521/143, 94, 97, 521/98, 82

[56] References Cited

U.S. PATENT DOCUMENTS

| | | | |
|---|---|---|---|
| 3,696,059 | 10/1972 | Hosoda et al. | 260/2.5 |
| 4,085,073 | 4/1978 | Sutt et al. | 521/79 |
| 4,298,706 | 11/1981 | Ueno et al. | 521/92 |
| 4,387,169 | 6/1983 | Zabrocki et al. | 521/79 |
| 4,521,487 | 6/1985 | Mitsuno et al. | 428/407 |
| 4,522,955 | 6/1985 | Fukushima et al. | 521/143 |
| 4,714,716 | 12/1987 | Park | 521/79 |
| 4,795,763 | 1/1989 | Gluck et al. | 521/99 |
| 4,801,484 | 1/1989 | Yao et al. | 428/294 |
| 4,832,770 | 5/1989 | Nojiri et al. | 264/45.3 |

FOREIGN PATENT DOCUMENTS

WO9216363  1/1992  WIPO ................. B32B 3/26

*Primary Examiner*—Morton Foelak

[57] ABSTRACT

Disclosed is a low density, dimensionally-stable, extruded propylene polymer foam comprising primarily of an expanded propylene polymer material wherein the foam has a blowing agent comprising at least 15 percent by weight of one or more inorganic blowing agents. The propylene polymer material comprises at least about 15 weight percent of propylene monomeric units. The foam has a density of from about 10 to about 150 kilograms per cubic meter. The foam having an average cell wall thickness of less than about 35 micrometers.

21 Claims, No Drawings

DIMENSIONALLY-STABLE POLYPROPYLENE FOAM EXPANDED WITH INORGANIC BLOWING AGENTS

CROSS-REFERENCE TO RELATED APPLICATIONS

This application is a Rule 60 Continuation of application Ser. No. 08/141,902 filed Oct. 22, 1993, which is a Rule 62 Continuation-In-Part of application Ser. No. 07/831,123 filed Feb. 4, 1992, both now abandoned.

BACKGROUND OF THE INVENTION

This invention relates to a low density, dimensionally-stable, extruded propylene polymer foam blown with a blowing agent comprising partly or entirely one or more inorganic blowing agents. The foam offers excellent cushioning properties.

Propylene polymer foams are known in the art, and have been found useful in many applications such as seen in U.S. Pat. Nos. 3,481,455, 3,871,897, 3,932,569, 4,522,955, and 4,832,770. Such foams have been made with a wide variety of organic and inorganic blowing agents.

Given current environmental concerns over the use of organic blowing agents, it would be desirable to have an extruded propylene polymer foam blown partly or solely with inorganic blowing agents. It would be further desirable to have such a dimensionally-stable, low density foam (e.g. 10 to 70 kilograms per cubic meter) for use in cushioning applications. It would also be desirable to have such a foam that is partially open-cell (e.g. at lest 5 percent) since open-cell foams are easier to produce and dimensionally more stable than corresponding closed-cell foams.

SUMMARY OF THE INVENTION

According to the present invention, there is a low density, dimensionally-stable, extruded propylene foam comprising a propylene polymer material wherein the foam has a blowing agent comprising at least about 15 percent by weight of one or more inorganic blowing agents. The propylene polymer material comprises at greater than 50 percent by weight propylene monomeric units. The foam has a density of from about 10 to about 150 kilograms per cubic meter. Foam preferably has a density of from about 10 to about 70 kilograms per cubic meter.

Further according to the present invention, there is a process for making a dimensionally-stable, extruded propylene polymer foam. The process comprises the steps of (a) heating the propylene polymer material comprising greater than 50 weight percent propylene monomeric units to form a melt polymer material; (b) incorporating into the melt polymer material a blowing agent comprising at least about 15 weight percent of one or more inorganic blowing agents to form a foamable gel; (c) extruding the foamable gel through a die to form the foam.

DETAILED DESCRIPTION OF THE INVENTION

Suitable propylene polymer materials include propylene homopolymers (polypropylene) and copolymers of propylene and copolymerizable ethylenically unsaturated comonomers. The propylene polymer material may further include non-propylenic polymers. The propylene polymer material may be comprised solely of one or more propylene homopolymers, one or more propylene copolymers, a blend of one or more of each of propylene homopolymers and copolymers, or blends of any of the foregoing with a non-propylenic polymer. Regardless of composition, the propylene polymer material comprises at greater than 50 and preferably at least about 80 weight percent of propylene monomeric units.

Suitable monoethylenically unsaturated comonomers include olefins, vinylacetate, methylacrylate, ethylacrylate, methyl methacrylate, acrylic acid, itaconic acid, maleic acid, maleic anhydride, and the like. The propylene copolymer preferably comprises about 20 percent or less by weight of the ethylenically unsaturated comonomer.

Suitable non-propylenic polymers incorporatable in the propylene polymer material include high, medium, low, and linear density polyethylenes, polybutene-1, ethylene-acrylic acid copolymer, ethylene-vinyl acetate copolymer, ethylene-propylene rubbery styrene-butadiene rubbery ethylene-ethyl acrylate copolymer, ionomer and the like.

Particularly useful propylene copolymers are those copolymers of propylene and one or more non-propylenic olefins. Propylene copolymers include random and block copolymers of propylene and an olefin selected from the group consisting of ethylene, $C_4$–$C_{10}$ 1-olefins, and $C_4$–$C_{10}$ dienes. Propylene copolymers also include random terpolymers of propylene and 1-olefins selected from the group consisting of ethylene and $C_4$–$C_8$ 1-olefins. In terpolymers having both ethylene and $C_4$–$C_8$ 1-olefins, the ethylene content is preferably 20 percent or less by weight. The $C_4$–$C_{10}$ 1-olefins include the linear and branched $C_4$–$C_{10}$ 1-olefins such as, for example, 1-butene, isobutylene, 1-pentene, 3-methyl-1-butene, 1-hexene, 3,4-dimethyl-1-butene, 1-heptene, 3-methyl-1-hexene, and the like. Examples of $C_4$–$C_{10}$ dienes include 1,3-butadiene, 1,4-pentadiene, isoprene, 1,5-hexadiene, 2,3-dimethyl-1,3-hexadiene, and the like.

Also, as used herein, the propylene polymer material has a melt flow rate of between about 0.05 and 50 and preferably between 0.1 and 10 according to ASTM D1238 Condition L.

The preferred propylene polymer resins for the present invention are those polypropylene resins which are branched or lightly cross-linked polymer materials. Branching (or light cross-linking) may be obtained by those methods generally known in the art, such as chemical or irradiation branching/light cross-linking. One such resin which is prepared as a branched/lightly cross-linked polypropylene resin prior to using the polypropylene resin to prepare a finished polypropylene resin product and the method of preparing such a polypropylene resin is described in U.S. Pat. No. 4,916,198, which is hereby incorporated by reference. Another method to prepare branched/lightly cross-linked polypropylene resin is to introduce chemical compounds into the extruder, along with a polypropylene resin and allow the branching/lightly cross-linking reaction to take place in the extruder. U.S. Pat. No. 4,714,716 illustrates this method and is incorporated by reference.

Suitable branching/crosslinking agents for use in extrusion reactions have been found to include azido and vinyl functional silanes, organic peroxides and multifunctional vinyl monomers.

It is also possible to add various additives such as inorganic fillers, pigments, antioxidants, acid scavengers, ultra-violet absorbers, flame retardants, processing aids, extrusion aids, and the like.

In addition, a nucleating agent may be added in order to control the size of foam cells. Preferred nucleating agents include inorganic substances such as calcium carbonate, talc, clay, titanium oxide, silica, barium sulfate, diatomaceous earth, mixtures of citric acid and sodium bicarbonate, and the like. The amount of nucleating agent employed may range from about 0.01 to about 5 parts by weight per hundred parts by weight of a polymer resin. The preferred range is from 0.1 to about 3 parts by weight.

Suitable inorganic blowing agents useful in making the foams of the present invention include carbon dioxide, nitrogen, argon, water, air, nitrogen, and helium. The blowing agent will be comprised of at least about 15 percent by weight, preferably at least about 50 percent by weight, more preferably at least about 95 percent by weight, and most preferably entirely of one or more of these inorganic agents. Preferred blowing agents include carbon dioxide, nitrogen, and water. Most preferred blowing agents are carbon dioxide and a mixture of carbon dioxide and water. The balance of the blowing agent may comprise one or more chemical or volatile organic blowing agents. Preferred blowing agents, however, are free of volatile organic agents and chemical blowing agents. Organic blowing agents include aliphatic hydrocarbons having 1–9 carbon atoms and halogenated aliphatic hydrocarbons, having 1–4 carbon atoms. Aliphatic hydrocarbons include methane, ethane, propane, n-butane, isobutane, n-pentane, isopentane, neopentane, and the like. Among halogenated hydrocarbons, fluorinated hydrocarbons are preferred. Examples of fluorinated hydrocarbon include methyl fluoride, perfluoromethane, ethyl fluoride, 1,1-difluoroethane, 1,1,1-trifluoroethane (HFC-143a), 1,1,1,2-tetrafluoro-ethane (HFC-134a), pentafluoroethane, perfluoroethane, 2,2-difluoropropane, 1,1,1-trifluoropropane, perfluoropropane, perfluorobutane, perfluorocyclobutane. Partially halogenated chlorocarbons and chlorofluorocarbons for use in this invention include methyl chloride, methylene chloride, ethyl chloride, 1,1,1-trichloroethane, 1,1-dichloro-1-fluoroethane (HCFC-141b), 1-chloro-1,1-difluoroethane (HCFC-142b), 1,1-dichloro-2,2,2-trifluoroethane (HCFC-123) and 1-chloro-1,2,2,2-tetrafluoroethane (HCFC-124). Fully halogenated chlorofluorocarbons include trichloromonofluoromethane (CFC-11), dichlorodifluoromethane (CFC-12), trichlorotrifluoroethane (CFC-113), dichlorotetrafluoroethane (CFC-114), chloroheptafluoropropane, and dichlorohexafluoropropane. Fully halogenated chlorofluorocarbons are not preferred due to their ozone depletion potential. Chemical blowing agents include azodicarbonamide, azodiisobutyro-nitrile, benzene-sulfonhydrazide, 4,4-oxybenzene sulfonyl-semicarbazide, p-toluene sulfonyl semicarbazide, barium azodicarboxylate, N,N'-dimethyl-N,N'-dinitrosoterephthalamide, and trihydrazino triazine.

The amount of blowing agent incorporated into the polymer melt to make a foam-forming polymer gel is from about 0.2 to about 5.0, preferably from about 0.5 to about 3.0, and most preferably from about 1.0 to 2.50 moles per kilogram of polymer.

The present foam may be closed cell or open cell. Preferably, the present foam is from about 5 to about 100 and most preferably from about 20 to about 70 percent open cell according to ASTM D2856-A. Some open cell content is preferred in the present foam because an open cell foam is more dimensionally stable than a corresponding closed cell foam when prepared with fast permeating blowing agents such as carbon dioxide and water. The open cell foams prepared from the propylene polymer provide a high degree of resiliency most normally only seen in closed cell foams.

The present foam has the density of from about 10 to about 150 and most preferably from about 10 to about 70 kilograms per cubic meter. The foam has an average cell size of from about 0.1 to about 5.0 and preferably from about 0.2 to about 1.5 millimeters according to ASTM D3576.

The present foam has the cell wall thickness of less than 35, preferably less than 25, and most preferably less than 15 micrometers according to the formula below. It is believed that blowing agents diffuse out more rapidly from thinner cells walls than thicker ones providing more effective quenching and timely stiffening of the cell walls. As a result, the expanding bubbles become more effectively stabilized providing a low density foam having greater resiliency. The thickness of cell wall may be calculated approximately from the foam density and cell size by the use of following equation (1):

$$t = 0.46 \, D/B \tag{1}$$

where t is the thickness of cell walls in micrometers ($\mu$): D is cell size in micrometers and: B, the expansion ratio of the cellular body. Since the expansion ratio, B, can be equated the ratio of the polymer density ($\rho_p$) to foam density ($\rho_f$), the thickness of cell walls may be represented by equation (2):

$$t = (0.46/\rho_p)\rho_f D \tag{2}$$

For example, for polypropylene having 900 kg/m³ density to have cell wall thickness less than or equal to 35 micrometers:

$$(\rho_f)(D) \leq 68.5 \, (Kg/m^3 \cdot mm) \tag{3}$$

Equation 3 indicates that, for example, a 70 Kg/m³ density foam must have cell size no greater than 0.98 mm. In order to meet the more preferred criterion $t \leq 15$ micrometers, a 70 kg/m³ density foam must have a cell size no greater than 0.42 mm.

The present foams may be made in any cross-sectional size or configuration such as foam sheet or plank, but are particularly useful in making plank foam having a major dimension in cross-section of at least about 5 centimeters or a cross-sectional area of at least about 10 square centimeters.

The present propylene polymer foam is generally prepared by heating a propylene polymer material to form a plasticized or melt polymer material, incorporating therein a blowing agent to form a foamable gel, and extruding the gel through a die to form the foam product. The blowing agent may be incorporated or mixed into the plastic melt by any means known in the art such as with an extruder, mixer, blender, or the like. Prior to mixing with the blowing agent, the plastic material is heated to a temperature at or above the glass transition temperature or the melting point of the plastic material. The blowing agent is mixed with the plastic melt at an elevated pressure sufficient to prevent substantial expansion of the melt and to generally disperse the blowing agent homogeneously within the melt. Such a pressure is typically at least above 345 kilopascals gauge and more preferably above 6900 kilopascals gauge. Optionally, a nucleator is blended in the polymer melt. The feeding rate of blowing agent and nucleator are adjusted to achieve a relatively low density foam and small cell size, which results in a foam having thin cell walls. After incorporation of the blowing agent, the foamable gel is typically cooled to a lower temperature to optimize physical characteristics of the foam product. The gel is then extruded through a die of desired shape to a zone of lower pressure to form the foam product.

Other suitable processes for making the present foam are the coalesced foam process as described in U.S. Pat. No. 4,824,720 and the accumulating extrusion process described in U.S. Pat. No. 4,323,528, both hereby incorporated by reference.

U.S. Pat. No. 4,824,720, which describes the coalesced (or strand) foam process, is hereby incorporated by reference. This patent describes a method for providing a closed cell foam structure comprising a plurality of coalesced extruded strands or profiles by extrusion foaming of a molten thermoplastic composition utilizing a die containing a multiplicity of orifices. The orifices are so arranged such that the contact between adjacent streams of the molten extrudate occurs during the foaming process and the contacting surfaces adhere to one another with sufficient adhesion to result in a unitary structure. The individual strands of coalesced polyolefin foam should remain adhered into a unitary structure to prevent strand delamination under stresses encountered in preparing, shaping, and using the foam.

U.S. Pat. No. 4,323,528 describes an accumulating extrusion process and also is hereby incorporated by reference. In this accumulating extrusion process low density, elongated cellular bodies having large lateral cross-sectional areas are prepared by: 1) forming, under pressure, a mixture of a thermoplastic polymer and a blowing agent, with the mixture having a temperature at which the viscosity of the mixture is sufficient to retain the blowing agent when the mixture is allowed to expand; 2) extruding the mixture into a holding zone maintained at a temperature and pressure which does not allow the mixture to foam, the holding zone having an outlet die defining an orifice opening into a zone of lower pressure at which the mixture foams, and an openable gate closing the die orifice; 3) periodically opening the gate; 4) substantially concurrently applying mechanical pressure by a movable ram on the mixture to eject the mixture from the holding zone through the die orifice into the zone of lower pressure, at a rate greater than that at which substantial foaming in the die orifice occurs and less than that at which substantial irregularities in cross-sectional area or shape occurs; and 5) permitting the ejected mixture to expand unrestrained in at least one dimension to produce an elongated thermoplastic cellular body.

The present foams offer excellent cushioning properties and resiliency. The present foams are suitable for cushion packaging since the foams have adequate impact absorption properties and resilience. The foam products mitigate impact during multiple drops. The more closed cell foams function better than the more open cell foams, but the open cell foams absorb dynamic impacts surprisingly well. In addition, the open cell foams can be used for sound absorption. The foams can be used for thermal insulation as well.

The present foams have satisfactory dimensional stability even though the foams are expanded with fast permeating blowing agents. Preferred foams recover ≧80 percent of initial volume within a month with initial volume being measured within 30 seconds after extrusion.

The present foam structure may comprise carbon black. The structure may comprise from about 1.0 to about 25 weight percent and preferably from about 4.0 to about 10 weight percent carbon black based upon the weight of the propylene polymer material. The foam structure has incorporated therein an amount of carbon black sufficient to decrease the thermal conductivity of the foam structure relative to a corresponding foam structure without the carbon black. Useful carbon blacks include thermal black, furnace black, acetylene black, and channel black. A preferred carbon black is thermal black.

EXAMPLES

Example 1

An open-cell, dimensionally-stable foam of the present invention was prepared according to the process of the present invention.

The polypropylene resin used was Himont HMS (high melt strength) 2/98 ethylene/propylene random copolymer (polymer) with a melt flow rate (MFR) of 0.47 (ASTM D 1238 Condition L). Granular copolymer and an antioxidant concentrate were fed to an extruder at a total rate of approximately 113.4 kilograms/hour (kg/hr) (250 pounds/hour) (lbs/hr). The antioxidant concentrate contained 8.4 percent each of a hindered phenol-type antioxidant (Irganox 1010 by Ciba-Geigy Corp.) and a phosphite-type antioxidant (Ultranox 626 by General Electric Co.). The concentration of antioxidant in the extrudate was about 0.2 parts per hundred (pph) parts polymer.

The extruder was a 90 millimeter (3½ inch) screw type having additional zone of mixing and cooling following the usual sequential zones of feeding, metering, and mixing. The temperatures maintained at the extruder zones were 130° C. at the feeding zone, 200° C. at the melting zone, 230° C. at the metering zone and 210° C. at the mixing zone. The extrudate was cooled to approximately 152° C. in the cooling zone prior to foaming.

The blowing agents were injected into the same injection port into the extruder barrel between the metering and mixing zones. The blowing agents comprised carbon dioxide ($CO_2$) and water ($H_2O$) in amounts of 1.9 gram moles per kilogram of polymer (mpk) and 0.58 mpk, respectively.

A die having a gap-adjustable, rectangular orifice was situated after the cooling zone. The die width was fixed at 25.4 mm (1 inch). The die gap was readjusted to about 1.85 mm to prevent prefoaming. The die pressure at the critical die gap was 630 pounds per square inch gauge (psig) (4.3 megapascals (MPa)).

A stable, open-cell foam approximately 2.8 centimeters (cm) thick and 9.4 cm wide was produced. As shown in Table I, the foam exhibited excellent dimensional stability. The cell wall thickness is calculated to be about 11 micrometers.

TABLE I

| Foam Density | Cell Size | Open Cell | Dimensional Stability | | | |
|---|---|---|---|---|---|---|
| ($kg/m^3$) (1) | (mm) (2) | Content (3) | Min. (4) | 1 day (5) | 1 week (5) | 1 month (5) |
| 31 | 0.69 | 64 | 95 | 96 | 105 | 105 |

Notes:
(1) Density of foam body measured in about one month after foam expansion and expressed in kilograms per cubic meter ($kg/m^3$).
(2) Cell size in millimeters per ASTM D3576.
(3) Open cell content in percentage per ASTM D2856-A
(4) Minimum volume of foam body experienced during aging as a percentage of the initial volume determined within 30 seconds after foam expansion. The minimum occurred at 5 min. after extrusion for this foam.
(5) Volume of foam body at the specified time after foam expansion as a percentage of the initial volume.

Example 2

The apparatus employed was substantially the same as in Example 1 except that the die was replaced with a multi-orifice die. The multi-orifice die had a total of 450 holes of 0.041 inch (1.04 mm) in diameter arranged in a equilateral triangular pattern. The holes are each spaced-apart by 0.25 inch (6.35 mm), and form 15 rows of 30 holes.

The extrudate was of substantially the same composition as that made in Example 1, except that the feed rate of solids (polymer and antioxidant concentrate) to the extruder was lowered to 90.7 kgs/hr (200 lbs/hr). The feed rates of antioxidant concentrate, carbon dioxide, and water lowered accordingly. The extrudate was cooled to 151° C. in the cooling zone prior to foaming.

A stable foam body of coalesced strands with excellent strand-to-strand adhesion. At a die pressure of 4.1 MPa (600 psig), the foam showed no sign of prefoaming. The foam had an approximately rectangular cross-section of 5.1 cm in thickness and 18.0 cm in width. The foam had a density of 34.0 kg/m$^3$ (2.12 pcf), cell size of 0.48 mm, and open cell content of 82 percent. The thickness of cell walls is calculated to be about 8.3 micrometers.

As shown in Table II, the foam exhibited excellent dimensional stability, and, for its high open content, a satisfactorily high compressive strength to render it suitable for cushion packaging and other applications. The foam also recovered well after high compression.

TABLE II

| Dimensional stability | | | | Compressive Strength | | |
| --- | --- | --- | --- | --- | --- | --- |
| Min. (1) | 1 day | 1 week (2) | 1 month | V | E (3) | H |
| 95 | 97 | 97 | 97 | 51 | 171 | 61 |

Notes:
(1) Same as Table 1.
(2) Same as Table 1.
(3) Compressive strength at 25% deflection in kilopascals per ASTM D3575: V = vertical direction, E = extrusion direction, and H = horizontal direction Example 3

The apparatus employed was substantially the same as in Example 2.

Process conditions were substantially the same except as follows: a 90/10 blend of a Himont HMS polypropylene homopolymer having a melt flow rate of 0.42 and a 93.5/6.5 ethylene/acrylic acid (EAA) copolymer having a melt index (ASTM 1238 Condition E) of 5.5 was expanded with a $CO_2/H_2O$ blowing agents at 1.5 mpk/0.57 mpk (6.6 pph/1.30 pph), and the solids (polymers and antioxidant concentrate) were fed to the extruder at a rate of 136 kgs/hr (300 lbs/hr). The extrudate was cooled to 162° C. in the cooling zone prior to foaming.

A stable foam body of coalesced strands with excellent strand-to-strand adhesion. At a die pressure of 4.8 MPa (700 psig), the foam showed no sign of prefoaming. The foam had an approximately rectangular cross-section of 6.4 cm in thickness and 19.3 cm in width. The foam had a density of 39.4 kg/m$^3$ (2.46 pcf), cell size of 1.29 mm, and open cell content of 69 percent. The thickness of the cell walls is calculated to about 26 micrometers.

As shown in Table III, the foam exhibited excellent dimensional stability, and, for its high open content, a satisfactorily high compressive strength to render it suitable for cushion packaging and other applications. The foam also recovered well after high compression.

TABLE III

| Dimensional Stability | | | | Compressive Strength | | |
| --- | --- | --- | --- | --- | --- | --- |
| Min. (2) | 1 day | 1 week | 1 month (3) | V | E | H (1) |
| 92 | 94 | 95 | 95 | 46 | 237 | 52 |

Notes:
(1) Same as Table I except that the minimum occurred at 15 min. after extrusion.
(2) Same as Table I
(3) Same as Table II Example 4

The apparatus employed is a 38 mm (1½ in) screw type extruder of substantially the same configuration as the extruder in Example 1 except as described below. The apparatus has a gap-adjustable die of 6.35 mm (0.25 in) width.

Foams were produced by the substantially the same procedure as in Example 1. Himont HMS 2/98 ethylene/propylene (E-P) random copolymer having a melt flow rate of 0.34 (ASTM D1238 Condition L) was employed. The level of antioxidant (Irganox 1010 by Ciba-Geigy Corp.) was adjusted to 0.1 pph. The extruder was adjusted to a solids extrusion rate of 3.7 kgs/hr (8.1 lbs/hr). The temperatures in the extruder were 160° C. at feeding zone, 200° C. at melting zone, 200° C. at metering zone, and 190° C. at mixing zone. A blowing agent or blowing agents were selected from carbon dioxide, water and nitrogen as represented in Table IVa. A predetermined amount of each blowing agent were injected separately into the injection port.

The temperature of the cooling zone was varied among the tests as necessary to provide a good foam. The foaming temperature was varied slightly between 152° C. and 158° C. as necessary. When the foaming temperature was reached, the die gap was readjusted to produce a foam of the largest cross-section possible free from prefoaming. The threshold die gap for prefoaming (called critical die gap hereinafter) was varied from about 0.36 mm to 1.1 mm. The die pressure at the critical die gap ranged from 5.7 MPa (830 psig) to 12.1 MPa (1750 psig).

Foam samples of approximately 12 cm (5 in) in length were examined for processability, dimensional stability, and quality. The results are set forth in Tables IVa and IVb.

TABLE IVa

| | Processability and Quality | | | | | | | | |
| --- | --- | --- | --- | --- | --- | --- | --- | --- | --- |
| Test No. | $CO_2$ (1) | $H_2O$ (2) | $N_2$ (3) | Foam Size (4) | Foam Dens. (5) | Cell Size (6) | Wall Thick (7) | Open Cell (8) | Foam Qual. (9) |
| 4.1 | 1.6 | 0 | 0 | 1.4 | 36 | 0.49 | 9 | 57 | G |

TABLE IVa-continued

| | | | | Processability and Quality | | | | | |
|---|---|---|---|---|---|---|---|---|---|
| Test No. | CO$_2$ (1) | H$_2$O (2) | N$_2$ (3) | Foam Size (4) | Foam Dens. (5) | Cell Size (6) | Wall Thick (7) | Open Cell (8) | Foam Qual. (9) |
| 4.2 | 2.0 | 0 | 0 | 1.2 | 36 | 0.32 | 7 | 60 | SV |
| 4.3 | 1.5 | 0.5 | 0 | 0.9 | 44 | 0.37 | 8 | 40 | G |
| 4.4 | 1.0 | 1.0 | 0 | 1.0 | 44 | 0.27 | 6 | 42 | G |
| 4.5* | 0.8 | 0.8 | 0 | 3.0 | 49 | 1.80 | 45 | 84 | V |
| 4.6* | 0.5 | 1.5 | 0 | 3.4 | 44 | 3.24 | 73 | 61 | H |
| 4.7 | 1.0 | 0.8 | 0.2 | 1.2 | 49 | 0.70 | 18 | 52 | G |
| 4.8 | 1.3 | 0 | 0.3 | 0.6 | 44 | 0.17 | 4 | 20 | G |
| 4.9* | 0 | 2.0 | 0 | 2.7 | 192 | 5.40 | 530 | 55 | C |
| 4.10 | 0 | 2.0 | 0.2 | 1.2 | 57 | 0.77 | 23 | 72 | SC |
| 4.11 | 0 | 1.6 | 0.3 | 0.9 | 48 | 0.31 | 8 | 44 | G |

Notes:
*Not an example of this invention
(1), (2) and (3) gram-moles of carbon dioxide, water, and nitrogen mixed in per one kilogram of polymer
(4) Cross-sectional area of foam body in square centimeters
(5) Density of foam body aged for about a month in kilogram per cubic meters
(6) Cell size in millimeters determined per ASTM D3576
(7) Thickness of cell walls in micrometers
(8) Open cell content in percentage determined per ASTM 2856-A
(9) Quality of foam body;
G = good foam having uniform cell distribution
V = foam body contains a number of voids
SV = foam body contains some voids
H = foam body contains large holes
C = foam body severely collapses
SC = foam body experiences a slight collapse TABLE IVb

| | Dimensional Stability | | | |
|---|---|---|---|---|
| Test No. | Minimum (1) | 1 day (2) | 1 week (2) | 1 month (2) |
| 4.1 | 100 | 104 | 102 | 103 |
| 4.8 | 87 | 99 | 101 | 101 |
| 4.11* | 85 | 95 | 98 | 100 |

Notes:
(1) Minimum volume of foam body experienced during aging as a percentage of the initial volume which was determined within 30 seconds after foam expansion. The minimum occurred at 15 min. after extrusion for this foam.
(2) Volume of foam body at the specified time after foam expansion as a percentage of the initial volume.
*For this foam, the stability is expressed by foam volume as a percentage of the volume of one month-old foam body.

In Tests 4.1 through 4.4, 4.7 and 4.8, good foams having low densities, small cells, and satisfactory cross-sectional sizes were obtained using carbon dioxide, carbon dioxide/water, carbon dioxide/water/nitrogen, carbon dioxide/nitrogen, and water/nitrogen as blowing agents. The foams had 20–60 percent open cells, and exhibit excellent dimensional stability.

Example 5

Substantially the same apparatus and operating procedure of Example 4 were employed. The resin utilized was a Himont HMS 2/98 ethylene/propylene random copolymer having a melt flow rate of 0.53 (ASTM D1238 Condition L). The temperatures maintained in the extruder were 170° C. at feeding zone, 230° C. at melting zone, 200° C. at metering zone and 185° C. at mixing zone. Carbon dioxide and mixtures of same with water were employed as the blowing agent.

The temperature of the cooling zone was adjusted among the tests to provide a good foam. The foaming temperature varied between 149° and 150° C. The critical die gap and die pressure ranged from about 0.65 mm to 0.71 mm and from 7.4 MPa (1070 psig) to 8.8 MPa (1270 psig).

In addition to data and samples taken at the critical die gap, larger samples of the same formulation were produced by an accumulating extrusion scheme using the adjustable die orifice (hereinafter referred to as pseudo-accumulation extrusion).

A pseudo-accumulating extrusion scheme was also utilized. After a steady extrusion sample was taken, the die orifice was closed to accumulate the foamable melt in the extrusion line until the die pressure increased by about 3.5 MPa (500 psi) and then the die was quickly opened to about 1.8–2.0 mm gap allowing the extrudate melt to exit the die and foam. The instantaneous extrusion rate was 8–9 kgs/hr (17–20 lbs/hr), about twice as high as the steady state extrusion rate. The pseudo-accumulating scheme simulates a high rate of steady extrusion. The pseudo-accumulating scheme produced good, lower-density foam strands free from corrugation. A fine-celled low-density foam often suffers corrugation of the foam body in the transverse direction when the extrusion rate is not sufficiently high enough. The foam samples produced by the pseudo-extrusion were used to determine dimensional stability. The processability, quality, and dimensional stability of the foams produced in this Example are set forth in Table Va and Vb, respectively.

The results of the tests demonstrate that relatively thin walls yield better quality foams, which are made at a higher level of carbon dioxide. A higher level of blowing agent not only provides a lower foam density but makes the cell size smaller. The foams produced in Tests 5.4a and 5.4b, with cell walls thicker than 35 microns, have large holes at the center. The foams made in Tests 5.2 and 5.2b have 30–31 micron cell walls and are marginally acceptable with some voids. Other foams having cell walls thinner than 10 microns are good in integrity with a uniform distribution of cell sizes.

Two foams tested exhibit satisfactory dimensional stability. It was noted that the higher density foam made in Test 5.3b exhibits the better dimensional stability than the slightly lower density foam made in Test 5.1b.

TABLE Va

| | | | Processability and Quality | | | | | |
|---|---|---|---|---|---|---|---|---|
| Test No. (1) | $CO_2$ (2) | $H_2O$ (3) | Foam Size (4) | Foam Dens. (5) | Cell Size (6) | Wall Thick (7) | Open Cell (8) | Foam Qual. (9) |
| 5.1a | 1.5 | 0.5 | 1.0 | 36 | 0.39 | 7 | 26 | G |
| 5.1b | | | 1.2 | 31 | 0.29 | 5 | 27 | G |
| 5.2a | 1.0 | 0.5 | 1.5 | 41 | 1.47 | 31 | 74 | SV |
| 5.2b | | | 2.1 | 38 | 1.55 | 30 | 71 | SV |
| 5.3a | 1.6 | 0 | 0.9 | 44 | 0.30 | 7 | 33 | G |
| 5.3b | | | 2.1 | 33 | 0.30 | 5 | 21 | G |
| 5.4a* | 1.3 | 0 | 1.1 | 65 | 1.08 | 36 | 76 | H |
| 5.4b* | | | 2.1 | 71 | 1.01 | 37 | 52 | H |

Notes:
*Not an example of this invention
(1) Test a's represent a steady state extrusion and b's a pseudo-accumulating extrusion.
(2) and (3) G-moles of carbon dioxide and water mixed in per one kilogram of polymer
(4) Cross-sectional area of foam body in square centimeters
(5) Density of foam body aged for about a month in kilogram per cubic meters
(6) Cell size in millimeters determined per ASTM D3576
(7) Thickness of cell walls in micrometers
(8) Open cell content in percentage determined per ASTM 2856-A
(9) Quality of foam body;
G = good foam having uniform cell distribution
V = foam body contains a number of voids
SV = foam body contains some voids
H = foam body contains large holes TABLE Vb

| | Dimensional Stability | | | |
|---|---|---|---|---|
| Test No. | Minimum (1) | 1 day (2) | 1 week (2) | 1 month (2) |
| 5.1b | 76 | 88 | 93 | 95 |
| 5.3b | 100 | 106 | 107 | 106 |

Notes:
(1) Minimum volume of foam body experienced during aging as a percentage of the initial volume which was determined within 30 seconds after foam expansion. The minimum occurred at 15 min. after extrusion for this foam.
(2) Volume of foam body at the specified time after foam expansion as a percentage of the initial volume.

Example 6

Substantially the same apparatus and operating procedure of Example 4 were employed. A higher melt flow rate (MFR) resin was foamed with relatively small amount of carbon dioxide blowing agent and a cell nucleating agent. The resin employed was a Himont HMS 2/98 ethylene/propylene random copolymer having a MFR of 7.0 (ASTM D1238 Condition L). The cell nucleating agent was Hydrocerol CF-70 (Boehlinger Ingelheim KG). Hydrocerol CF-70 is a sodium carbonate/citric acid-type nucleating agent. A small amount (0.1 pph) Irganox 1010 antioxidant was incorporated.

The granular polypropylene resin was mixed with the antioxidant concentrate and 0.2 pph of nucleator pellets and extruded at a uniform rate of 4.7 kgs/hr (10.4 lbs/hr). The temperatures maintained in the extruder were 190° C. at feeding zone, 220° C. at melting zone, 210° C. at metering zone, and 180° C. at mixing zone. Carbon dioxide was injected into the blowing agent injection port at a predetermined uniform rate. The temperature of the cooling zone was adjusted in each test to provide a good foam. The foaming temperature of the formulations was 138°–139° C. The critical die gap and die pressure for the formulations in this example ranged from about 0.25 mm to 0.30 m and from 9.7 MPa (1410 psig) to 9.9 MPa (1430 psig).

As shown in Table VI, good foams having relatively high densities and uniformly small cell sizes were obtained using 0.6–0.9 mpk (2.6–4.0 pph) carbon dioxide. The good processability of the foams may in part be due to their relatively thin cell walls of 11–15 microns. Even though the foams had relatively low open cell contents, the foams were not observed to suffer unsatisfactory shrinkage during aging (not actually measured). The high compressive strengths of the high density foams are believed to have aided in the dimensional stability of those foams.

TABLE VI

| | | Processability and Quality | | | | | |
|---|---|---|---|---|---|---|---|
| Test No. | $CO_2$ (1) | Foam Size (2) | Foam Dens. (3) | Cell Size (4) | Wall Thick (5) | Open Cell (6) | Foam Qual. (7) |
| 6.1 | 0.9 | 0.6 | 53 | 0.44 | 12 | 17 | G |
| 6.2 | 0.8 | 0.6 | 59 | 0.36 | 11 | 7 | G |
| 6.3 | 0.6 | 0.5 | 70 | 0.42 | 15 | 16 | G |

Notes:
*Not an example of this invention
(1) gram-moles of carbon dioxide and water mixed in per one kilogram of polymer
(2) Cross-sectional area of foam body in square centimeters
(3) Density of foam body aged for about a month in kilogram per cubic meters
(4) Cell size in millimeters determined per ASTM D3576
(5) Thickness of cell walls in micrometers
(6) Open cell content in percentage determined per ASTM 2856-A
(7) Quality of foam body;
G = good foam having uniform cell distribution Example 7

The apparatus and its operating procedure used in this example were the same as in Example 5. The PP copolymer resin of Example 5 was blended with 10–20 percent of various ethylenic polymer resins and foamed with carbon of low open cell content is marginal in dimensional stability.

TABLE VIIA

| Test | Blend Resin | | | Processability | | Foam | Foam | Cell | Wall | Open | Foam |
| | | | | | | | | | | | |
| No. (1) | Type (2) | level (3) | $CO_2$ (4) | $H_2O$ (5) | | Size (6) | Dens. (7) | Size (8) | Thick (9) | Cell (10) | Qual. (11) |
|---|---|---|---|---|---|---|---|---|---|---|---|
| 7.1a | EAA | 10 | 1.7 | 0 | | 1.3 | 30 | 0.54 | 8 | 31 | G |
| 7.1b | | | | | | 2.9 | 31 | 0.52 | 8 | 34 | G |
| 7.2a | EAA | 10 | 1.5 | 0.5 | | 1.7 | 33 | 0.68 | 11 | 59 | G |
| 7.2b | | | | | | 5.0 | 30 | 0.62 | 10 | 50 | G |
| 7.3a | LDPE | 20 | 1.5 | 0.5 | | 1.1 | 37 | 0.34 | 6 | 39 | G |
| 7.3b | | | | | | 1.6 | 38 | 0.51 | 10 | 34 | G |
| 7.4a | IONOMER | 10 | 1.5 | 0.5 | | ND | ND | ND | ND | ND | G |
| 7.4b | | | | | | 4.6 | 29 | 0.52 | 8 | 10 | G |

Notes:
ND = Not determined
(1) Test a's represent a steady state extrusion and b's a pseudo-accumulating extrusion
(2) The type of ethylenic polymer blended in with the PP copolymer:
EAA = ethylene acrylic acid copolymer (9% AA, 1.5 melt index), Primacore 1410 resin by Dow Chemical Co.
LDPE = Dow low density polyethylene 682 (0.7 melt index)
Ionomer = Surlyn 1706 grade ionomer made by DuPont de Nemours & Co.
(3) The percentage of the ethylenic polymer blended in the total polymer
(4) and (5) G-moles of carbon dioxide and water mixed in per one kilogram of polymer
(6) Cross-sectional area of foam body in square centimeters
(7) Density of foam body aged for about a month in kilogram per cubic meters
(8) Cell size in millimeters determined per ASTM D3576
(9) Thickness of cell walls in micrometers
(10) Open cell content in percentage determined per ASTM 2856-A
(11) Quality of foam body;
G = good foam having uniform cell distribution dioxide or its mixture with water.

The ethylenic resins evaluated included Primacore 1410 ethylene/acrylic acid (EAA) copolymer (9 percent AA, 1.5 melt index) of The Dow Chemical Co., PE 682 low density polyethylene (LDPE) (0.7 melt index) of The Dow Chemical Co., and Surlyn 1706 brand ionomer (Ionomer) by E.I. DuPont de Nemours & Co. A small amount (0.1 pph) Irganox 1010 antioxidant was incorporated in the polymers.

The granular PP copolymer resin and a predetermined amount of a selected ethylenic resin were dry-blended with the antioxidant concentrate. The solid was extruded at a uniform rate of 3.7 kgs/hr (8.1 lbs/hr). The extruder zone temperatures were the same as in Example 5. The temperature of the cooling zone was adjusted in each of the tests of this example to provide a good foam. The foaming temperature of the formulations was 147°–149° C. Foams were made by conventional steady extrusion and pseudo-accumulating extrusion. The critical die gap and die pressures ranged from about 0.69 mm to 0.71 mm and from 8.6 MPa (1250 psig) to 9.1 MPa (1320 psig).

The processability, quality, and dimensional stability data is set forth in Tables VIIa and VIIb. All blends of the PP resin and ethylenic polymer yielded good quality foams having fine cells and low densities. The cell walls of the test foams are all thinner than 24 microns. It was surprising that polypropylene can accommodate as much as 20 percent of those ethylenic copolymers in expanding good low-density foams. Except for the foam made in Test 7.4b, the foams display satisfactory dimensional stability with open cell content greater than 30 percent. The PP/ionomer blend foam made in Test 7.4b exhibited marginal dimensional stability with excessive shrinkage (more than 50 percent) and slow recovery. Desirable foams recover at least 80 percent of its original volume within about a month. The low density foam TABLE VIIb

| | Dimensional Stability | | | |
| Test No. | Minimum (1) | 1 day (2) | 1 week (2) | 1 month (2) |
|---|---|---|---|---|
| 7.1b | 91 | 95 | 98 | 99 |
| 7.2b | 93 | 95 | 98 | 98 |
| 7.3b | 82 | 89 | 82 | 82 |
| 7.4b | 49 | 49 | 67 | 78 |

Notes:
(1) See Table Vb.
(2) See Table Vb.

Example 8

The apparatus employed is a 25 mm (1 in) screw type extruder of substantially the same configuration as that of Example 4. The adjustable die gap is 3.68 mm (0.145") in width.

The operating procedure was substantially the same as in Example 4. The same E-P copolymer of Example 4 was dry-blended with EAA resin, Ionomer resin, and 0.1 pph Irganox 1010, and fed to the extruder at a rate of 1.8 kgs/hr (4 lbs/hr). A binary blowing agent consisting of 0.8 mpk $CO_2$ and 0.8 mpk $H_2O$ was injected into the extruder barrel. The temperatures maintained at the extruder zones were 160° C. at feeding zone, 180° C. at melting zone, 210° C. at metering zone and 230° C. at mixing zone. Carbon dioxide and water were separately injected into the injection port each at a rate to be 0.8 mpk. The temperature of the cooling zone was adjusted in each test to provide a good foam. The foaming temperatures of the formulations evaluated in this example ranged from 165° C. to 168° C. The critical die gaps and the critical pressure were in the range of 0.36–0.51 mm (14–20 mils) and 4.5–7.9 MPa (650–1150 psig), respectively.

The processability, quality, and dimensional stability of the foams are set forth in Tables VIIIa and VIIIb. Both the E-P copolymer and its blends provided satisfactory foams having low foam densities and acceptable dimensional stabilities. While the foams having cell walls of 10 micron thickness were of excellent quality, those having 21–22 micron-thick cell walls were marginally satisfactory in quality. Tests 8.1, 8.2 and 8.3 indicate that addition of a small amount of EAA resin aids in foam expansion of the E-P copolymer with the relatively large amount of water blowing agent. The EAA resin may enhance solubility of water in the polymer melt.

TABLE VIIIa

| | Blend Resin | | Processability | | | | | | |
|---|---|---|---|---|---|---|---|---|---|
| Test No. | Type (1) | level (2) | $CO_2$ (3) | $H_2O$ (4) | Foam Size (5) | Foam Dens. (6) | Cell Size (7) | Wall Thick (8) | Open Cell (9) | Foam Qual. (10) |
| 8.1 | — | — | 0.8 | 0.8 | 0.7 | 44 | 0.95 | 21 | 81 | D |
| 8.2 | EAA | 5 | 0.8 | 0.8 | 0.7 | 40 | 0.51 | 10 | 21 | G |
| 8.3 | EAA | 10 | 0.8 | 0.8 | 1.0 | 35 | 1.25 | 22 | 83 | SD |
| 8.4 | Ionomer | 5 | 0.8 | 0.8 | 0.6 | 41 | 0.49 | 10 | 32 | G |

Notes:
(1) The type of ethylenic polymer blended in with the PP copolymer:
(2) The percentage of the ethylenic polymer blended in the total polymer
(3) and (4) G-moles of carbon dioxide and water mixed in per one kilogram of polymer
(5) Cross-sectional area of foam body in square centimeters
(6) Density of foam body aged for about a month in kilogram per cubic meters
(7) Cell size in millimeters determined per ASTM D3576
(8) Thickness of cell walls in micrometers
(9) Open cell content in percentage determined per ASTM 2856-A
(10) Quality of foam body;
G = good foam having uniform cell distribution
D = distribution of cell size
SD = slight distribution of cell size TABLE VIIIb

| | Dimensional Stability | | | |
|---|---|---|---|---|
| Test No. | Minimum (1) | 1 day (2) | 1 week (2) | 1 month (2) |
| 8.1 | 92 | 92 | 93 | 93 |
| 8.2 | 67 | 83 | 93 | 108 |
| 8.3 | 102 | 103 | 102 | 103 |
| 8.4 | | | (not determined) | |

Notes:
(1) See Table Vb
(2) See Table Vb

Example 9

The apparatus consisted of the 1½ inch foam extruder of Example 4, an accumulating extrusion system (AES) attached at the end of the cooling zone of the extruder, and a gap-adjustable die having an opening of 6.35 mm (0.25 in) width attached therewith. The foamable melt is accumulated in the accumulating chamber of 330 cubic centimeter capacity and then rapidly pushed out of the orifice by nitrogen pressure.

In this example, a 90/10 blend by weight of a 2/98 E-P copolymer (0.52 MFR) and Primacore® 1410 EAA copolymer was expanded with a binary blowing agent consisting of 1.5 mpk carbon dioxide and 0.5 mpk water. The solids were pre-blended, and extruded at a rate of 3.7 kgs/hr (8.1 lbs/hr). The temperatures in the extruder were 170° C. at feeding zone, 200° C. at melting zone, 220° C. at metering zone, and 180° C. at mixing zone. Carbon dioxide and water were separately injected into the injection port at a rate to be 1.5 and 0.5 mpk, respectively. The temperature of the cooling zone was adjusted to provide a good foam. The foaming temperature of the formulation was approximately 150° C. The critical die gap and die pressure were 0.8 mm and 8.0 MP (1160 psig), respectively.

As shown in Table IXa, a good foam having fine cell size was obtained by steady extrusion. The foam strand produced had some corrugation in the transverse direction.

The AES scheme was employed to produce larger foam than possible with steady extrusion. The temperatures of the accumulator and the transfer lines were maintained so that the foamable melt coming out of the extruder could be neither excessively cooled nor heated. The AES was operated as follows. First, the chamber was pressurized with nitrogen to about 700 psig, which was to exert back pressure for the incoming melt. Then, the extruder output was diverted into the accumulator. The accumulation lasted for approximately 3.5 minutes. The gas pressure increased and exceeded 8.3 MPa (1200 psig) as it was compressed by the incoming melt. During the accumulating operation, the die gap was opened to 3.1 mm (120 mils), and the nitrogen source pressure was adjusted to 9.0 MPa (1300 psig). Upon completion of accumulation, the accumulated melt was allowed to shoot out of the die orifice.

An excellent-quality foam free from corrugation was achieved. Several such shots were made to produce foams for property evaluation. The instantaneous extrusion rates, estimated from the weights of the extrudates and the shoot-out times, were ranged from 90 to 120 kgs/hr. The foams were observed to be dimensionally stable.

The foam plank produced by the AES scheme was aged for a month, and tested for its physical properties. The data is summarized in Table IXb. After the skins were taken off, the density of the AES foam was 24 kg/m³. (1.5 pcf), much lower than that with skin on (refer to Table IXa). The low-density foam having over 60 percent open cells displays strength, resiliency, and shock-mitigating property suitable for cushion packaging of relatively light weight items.

TABLE IXa

| | Blend Resin | | | | Processability and Quality | | | | | |
|---|---|---|---|---|---|---|---|---|---|---|
| Test No. | Type (1) | level (2) | $CO_2$ (3) | $H_2O$ (4) | Foam Size (5) | Foam Dens. (6) | Cell Size (7) | Wall Thick (8) | Open Cell (9) | Foam Qual. (10) |
| 9.1a | EAA | 10 | 1.5 | 0.5 | 1.6 | 39 | 0.58 | 12 | 36 | G |
| 9.1b | | | | | 8.9 | 30 | 0.62 | 10 | 67 | G |

Notes:
(1) Type of resin employed
(2) The percentage of the EAA copolymer blended in the total polymer
(3) and (4) gram-moles of carbon dioxide and water mixed in per one kilogram of polymer
(5) Cross-sectional area of foam body in square centimeters
(6) Density of foam body aged for about a month in kilogram per cubic meters
(7) Cell size in millimeters determined per ASTM D3576
(8) Thickness of cell walls in micrometers
(9) Open cell content in percentage determined per ASTM 2856-A
(10) Quality of foam body;
G = good foam having uniform cell distribution TABLE IXb

| | | Properties | | |
|---|---|---|---|---|
| Property | Unit | Method | Condition | Value |
| Compressive Strength | kPa | ASTM D3575B | @ 10% defl. | 38 |
| | | | 25% defl. | 47 |
| | | | 50% defl. | 65 |
| Compressive Recovery | % | Dow (1) | after 1 hr | 86 |
| | | | after 6 days | 93 |
| Dynamic Cushioning | G | Dow (2) | @ static stress (kPa) | |
| | | | 1.8 | 77 |
| | | | 3.5 | 70 |
| | | | 5.2 | 75 |
| | | | 8.6 | 104 |
| Recovery After D.C. | % | Dow (3) | @ static stress (kPa) | |
| | | | 1.8 | 95 |
| | | | 3.5 | 98 |
| | | | 5.2 | 98 |
| | | | 8.6 | 97 |

Notes:
*All properties are for the vertical direction
(1) Thickness of the specimen in percentage of the initial six days after it was compressed to 80% of the initial at rate of 1.27 cm/min (0.5"/min.)
(2) Average of peak deceleration during second to fifth drops in g's at the given static stress. The test specimens had 38 mm (1.5") thickness and 50 mm × 50 mm (2" × 2") impact area. The drop height of the weights was 61 cm (24").
(3) Thickness of the specimen in percentage of the initial six days after is was tested for the dynamic cushioning property.

Example 10

An extruded, propylene polymer foam structure in coalesced strand form containing carbon black was prepared with a mixture of carbon dioxide and water as the blowing agent.

A granular high-melt strength (HMS) polypropylene resin (ESCORENE PD 5291 by Exxon Chemical Co.) having a melt flow rate 0.25 decigrams/minute (dgx/min) (ASTM D1238 Condition L) was uniformly dry blended with carbon black and antioxidant concentrates. The carbon black concentrate contained 20 weight percent of furnace black of 82 nanometer average particle size and a 3/97 ethylene/propylene random copolymer by weight having a 0.52 dgs/min melt flow rate (ASTM D1238 Condition L). The antioxidant concentrate contained 8.4 weight percent of each of a hindered phenol-type antioxidant (Irganox 1010 by Ciba-Geigy Corp.) and a phosphite-type antioxidant (Ultranox 626 by General Electric Co.) in a 3/97 ethylene/propylene copolymer by weight having a 0.34 dgs/min melt flow rate (ASTM D1238 Condition L). The dry-blended resin blend contained 6 percent by weight carbon black and 0.1 parts per hundred parts polymer by weight of each of the antioxidants.

The resin blend was flood-fed into the hopper of an extruder. The extruder was a 38 millimeter (mm) (1½ inch) screw-type extruder having additional zones for mixing and cooling after the sequential zones of feeding, metering, and mixing. The extruder operated at a uniform rate of 3.68 kgs/hr (8 lbs/hr).

Carbon dioxide and water were injected into an injection port in the extruder barrel between the metering and mixing zones at uniform rates of 0.24 kgs/hr (6.6 pph or 1.5 mpk) and 0.034 kgs/hr (0.92 pph or 0.51 mpk), respectively.

The resulting extrudate (foamable gel) was cooled to a temperature of 167° C. in the cooling zone, and passed through a multi-orifice die. The die had 20 holes of 1.04 mm (0.041 in.) diameter arranged in 4 rows and 5 columns in a square pattern with adjacent rows and columns 6.35 mm (0.25 in.) apart.

The coalesced strand foam structure was of good quality, and had a 2.1 centimeter (cm) by 2.6 cm cross-section. As seen in Table A, the foam structure exhibited satisfactory physical properties, including thermal conductivity. The foam structure was free of distortion and corrugation in spite of the small cell size.

TABLE X

| | | Physical Properties | | | | | |
|---|---|---|---|---|---|---|---|
| Foam Density | Cell Size | Open Cell | Dimensional Stability[4] | | | | Thermal Conduct. (W/m · |
| $(kg/m^3)$[1] | $(mm)$[2] | (percent)[3] | 15M | 3D | 6D | 38D | $k°)$[5] |
| 41 | 0.12 | 21 | 88 | 85 | 86 | 89 | 0.036 |

[1] Density of foam body aged for a month in kilograms per cubic meter
[2] Cell size in millimeters determined per ASTM D3576
[3] Open cell content in percentage determined per ASTM D2856-A TABLE X-continued Physical Properties

| Foam Density (kg/m³)[1] | Cell Size (mm)[2] | Open Cell (percent)[3] | Dimensional Stability[4] | | | | Thermal Conduct. (W/m · k°)[5] |
| --- | --- | --- | --- | --- | --- | --- | --- |
| | | | 15M | 3D | 6D | 38D | |

[4]Volume of foam body at specified times after foam expansion as a percentage of the initial volume determined within 20 seconds after extrusion. M = minutes D = days
[5]Thermal conductivity of foam body in Watts per meter Kelvin. Specimen was aged four days at ambient temperature prior to testing While embodiments of the propylene polymer foam have been shown with regard to specific details, it will be appreciated that depending upon the properties of the foam and the manufacturer's desires the present invention may be modified by various changes while still being fairly within the scope of the novel teachings and principles herein set forth.

What is claimed is:

1. A dimensionally-stable, extruded propylene polymer foam, comprising: a propylene polymer material comprising greater than 50 percent by weight of propylene monomeric units, the foam having a blowing agent comprising at least about 15 percent by weight of one or more inorganic blowing agents, the foam having a density from about 10 to about 150 kilograms per cubic meter, the foam having an average cell wall thickness of less than about 35 micrometers, the foam being in plank form, the foam having a major dimension in cross-section of at least about 5 centimeters and a cross-sectional area of at least about 10 square centimeters.

2. The foam of claim 1, wherein the foam has a blowing agent comprising at least about 50 percent by weight of one or more inorganic blowing agents.

3. The foam of claim 1, wherein the foam has a blowing agent comprising at least about 95 percent by weight of one or more inorganic blowing agents.

4. The foam of claim 1, wherein the foam has a blowing agent comprised entirely of one or more inorganic blowing agents.

5. The foam of claim 1, wherein the foam is greater than 5 percent open cell.

6. The foam of claim 1, wherein the foam is about 20 percent to about 70 percent open cell.

7. The foam of claim 1, wherein the foam has an average cell size of about 0.1 to about 5 millimeters.

8. The foam of claim 1, wherein the foam has a density of about 10 to about 70 kilograms per cubic meter.

9. The foam of claim 1, wherein the foam recovers about 80 percent of its initial volume within 30 days after extrusion.

10. The foam of claim 1, wherein the propylene polymer material comprises at least about 80 percent by weight of propylene monomeric units.

11. The foam of claim 1, wherein the foam has an average cell size of about 0.2 to about 1.5 millimeters.

12. The foam of claim 1, wherein the foam has an average cell wall thickness of less than 15 micrometers.

13. The foam of claim 1, wherein the blowing agent is carbon dioxide.

14. The foam of claim 1, wherein the blowing agent is a mixture of carbon dioxide and water.

15. The foam of claim 1, wherein the blowing agent is a mixture of nitrogen and water.

16. The foam of claim 1, wherein the foam recovers greater than or equal to 80 percent of the initial volume within a month.

17. The foam of claim 1, wherein the foam is from about 5 to about 100 percent open cell.

18. The foam of claim 1, wherein the foam is from about 20 to about 70 percent open cell.

19. The foam of claim 1, wherein the foam has a cell wall thickness of less than 35 micrometers.

20. The foam of claim 1, wherein the foam has a cell wall thickness of less than 25 micrometers.

21. The foam of claim 1, wherein the foam has a cell wall thickness of less than 15 micrometers.

\* \* \* \* \*